United States Patent [19]

Schorr et al.

[11] Patent Number: 4,689,358

[45] Date of Patent: Aug. 25, 1987

[54] INSULATING POLYMER CONCRETE

[75] Inventors: H. Peter Schorr, Douglaston; Jack J. Fontana, Shirley; Meyer Steinberg, Melville, all of N.Y.

[73] Assignee: The Brooklyn Union Gas Company, Brooklyn, N.Y.

[21] Appl. No.: 762,876

[22] Filed: Aug. 6, 1985

[51] Int. Cl.$^4$ .................................................. C08K 3/34
[52] U.S. Cl. ............................... 523/209; 523/218; 523/446; 523/466
[58] Field of Search ............... 523/218, 205, 209, 446, 523/466; 524/444; 106/DIG. 2; 428/407

[56] References Cited

U.S. PATENT DOCUMENTS

| | | | |
|---|---|---|---|
| 3,558,591 | 1/1971 | Yendrek et al. | 523/218 |
| 3,677,999 | 7/1972 | Denk et al. | 523/457 |
| 3,930,590 | 1/1976 | Ebbrell | 220/9 |
| 4,209,267 | 6/1980 | Gnaedinger | 405/53 |
| 4,273,806 | 6/1981 | Stechler | 523/218 |
| 4,375,489 | 3/1983 | Muszynski | 523/218 |
| 4,378,402 | 3/1983 | Below | 524/444 |
| 4,403,048 | 9/1983 | Blitstein et al. | 523/218 |
| 4,425,440 | 1/1984 | Bloembergen et al. | 523/218 |
| 4,442,242 | 4/1984 | Fogelberg | 523/218 |
| 4,508,856 | 4/1985 | Smith et al. | 523/218 |
| 4,522,878 | 6/1985 | Martin et al. | 523/218 |

FOREIGN PATENT DOCUMENTS

| | | | |
|---|---|---|---|
| 2543536 | 10/1984 | France | 523/218 |
| 53-18647 | 2/1978 | Japan | 523/218 |
| 58-138728 | 8/1983 | Japan | 523/218 |
| 59-122529 | 7/1984 | Japan | 523/218 |
| 2144141 | 2/1985 | United Kingdom | 523/218 |
| 154994 | 1/1963 | U.S.S.R. | 523/218 |

*Primary Examiner*—Lewis T. Jacobs
*Attorney, Agent, or Firm*—Fitzpatrick, Cella, Harper & Scinto

[57] ABSTRACT

A lightweight insulating polymer concrete formed from a lightweight closed cell aggregate and a water resistance polymeric binder.

4 Claims, No Drawings

INSULATING POLYMER CONCRETE

BACKGROUND OF THE INVENTION

1. Field of the Invention

This invention relates generally to a concrete material and, more particularly, to lightweight polymer concrete material having good cryogenic, insulating and load bearing characteristics and which is highly resistant to water absorption.

2. Description of the Prior Art

Those skilled in the relevant art are aware that certain combustable fluids such as liquified natural gas (LNG) are stored in large vessels in or near populated areas, these vessels usually being surrounded by a containment such as a dike to contain the liquid in the event of a spill. It is recognized that, if a spill does occur, the liquid will boil upon contact with its surroundings and form a vapor at a temperature $-260°$ F. The vapor produced from the boiling gains additional heat from its surroundings and disperses downwind through mixing with ambient air to form a cloud. The gas vapor is typically at a concentration in the lower flammable range, which range is of the order of 5 to 15% vapor in air.

It is therefore important to limit the distance that the cloud will travel and since at approximately $-170°$ F., the vapor becomes lighter than air, rises and dissipates, the distance travelled is directly proportional to the amount of vapor produced because the smaller the amount of vapor produced, the sooner it will warm and rise. It will therefore be appreciated that if the boil-off rate can be retarded, the production of vapor will also be retarded. This can be achieved by reducing liquid contact with the warm surface between the containment vessel and the dike and with the surface of the dike itself as by applying an insulating layer to those surfaces.

Such an insulating layer must be able to be effective in cryogenic environments, able to tolerate crushing loads applied by vehicles driving on it, remain in place, be fireproof to reduce the danger of fire in the event of a small leak and ignition, resist adverse weather conditions, such as freezing, thawing and rainwater absorption and must be substantially maintenance free.

U.S. Pat. No. 3,930,590 discloses an installation for storing liquified gas and particularly LNG. The patentee has recognized that in the event of leakage of the gas caused by damage to vessels or lines, the cold liquified gas flows into the collecting space provided around the vessel and will absorb a large quantity of heat from the environment thus causing the liquid to evaporate and form a concentrated cloud of inflammable gas. The patent therefore discloses a heat insulating material applied to the surface of the ground at least in the collecting space and possibly the wall or dike defining the collecting space.

According to the teaching of the patent, the insulating material is a lightweight concrete material derived by modifying a normal, dense concrete. The desired insulating concrete may be obtained by the substitution of a hollow or cellular aggregate, which includes air in the mix, for the usual gravel or gravel and sand aggregates. In order to counter any tendency of the insulating material to absorb water, the surface of the insulating material is coated with a layer of material such as epoxy resin.

Thus, the patentee employs a portland cement concrete using lightweight aggregates on a substrate with a sealant between the substrate and the concrete layers and with a sealant layer on the top of the concrete. In such an arrangement, the sealant deteriorates with time and permits moisture to permeate into the concrete. Moreover, the cement itself has a water content which is sealed in. The water, whether it permeates into the concrete or is present in the mix, provides an added degree of thermal conductivity and therefore limits the efficiency of the system and also contributes to deleterious cryogenic effects during possible freeze-thaw cycles causing the concrete to spall thus requiring relatively frequent maintenance.

Other prior art known to Applicants is disclosed in U.S. Pat. Nos. 3,047,184, 3,791,164 and 3,844,122. As employed herein the terms "concrete" and "concrete material" define the same product.

SUMMARY OF THE INVENTION

We contribute by the present invention an insulating polymer concrete by which we are able to overcome the foregoing difficulties and disadvantages.

For attaining the objectives mentioned above and later to be expressed, the principal characteristic feature of the present invention resides in a lightweight, insulating polymer concrete comprising a lightweight closed cell aggregate and a water resistant polymeric binder therefor.

More preferably, the aggregate consists of hollow aluminum silicate spheres or expanded perlite coated with polyester resin, or a combination or mixture thereof, and the binder is preferably a flexible epoxy resin or an extended version thereof to which a hardener is added, if desired.

Additionally, a flame retardant agent may be added to the epoxy resin.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

DESCRIPTION OF THE PREFERRED EMBODIMENT

The phrase "polymer concrete" as employed herein is defined as a concrete in which a lightweight, closed-cell aggregate is bound in a dense matrix with a polymeric, water-resistant binder.

We have found that an improved heat-insulating material can be fabricated in the form of a lightweight concrete free of moisture and water resistant, having high crush and abrasion resistance and excellent cryogenic characteristics.

The aggregate can be inorganic or organic in nature. Organic aggregates formed from lightweight organic materials having a closed cell structure are employable, where the material to be stored adjacent the polymer concrete contained is not relatively flammable, such as ammonia or nitrogen gas or the like. If flammable materials are to be so stored it is preferred to utilize a flame retardant with the organic aggregate. Suitable organic aggregate materials include foamed "closed-cell" polyurethane, balsa wood chips, cork, polystyrene beads or the like.

The preferred aggregates are inorganic, especially where flammable materials are in close proximity. In general, the inorganic aggregate include minerals optionally treated with a coating agent, as portland concrete or the like. Suitable mineral aggregate materials include glass beads, zeolites, treated clays and treated fly-ash (i.e., treated to reduce voids and open cells therein).

Most preferably, the aggregate may comprise hollow aluminum silicate spheres, expanded perlite coated with polyester resin or a mixture thereof and the like. Such an aggregate constitutes a closed cell particle and, since bulk density may be controlled by choosing aggregate particles of varied sizes so that voids between larger particles are occupied by smaller particles, maximum bulk density may be obtained in which case, a minimum of binder will be required.

The binder for the aggregate should exhibit good bond strength to the conventional concrete substrate and/or overlayer, have a low shrinkage rate and a modulus of elongation less than the shear strength of the binder to the concrete. In addition, the binder should be relatively water-resistant. Volatile binders, which are subject to undue evaporation or undue shrinkage on curing, are not preferred, since they can cause the polymer concrete to crack or spall.

In general, thermosetting polymeric binders are preferably employed, such as those containing hydroxyl and/or carboxyl functionality, including acrylates and polyesters of the desired water resistance.

As a polymeric, water-resistant binder, it is preferable to employ an epoxy resin such as a flexible epoxy or an extended version thereof and the like. Epoxy resins are well known to the art and are conventionally made by condensing epichlorohydrin with bisphenol A. Other equivalents or derivatives of such epoxy resins which are water-resistant and act as binders can be employed. Conventional epoxy resins are formed by employing a two-part system of a mixture of monomers and a hardener for the mixture. The "hardener" can consist of an amine cross-linking agent and other reactants, catalysts and solvents required to complete the monomers condensation reaction. As employed herein, the term epoxy resin covers such a two-part or plural system.

In general, the weight ratio of aggregate material to binder is sufficient to form a stable matrix of high bulk density. Sufficient binder is present to ensure that the matrix exhibits low porosity to water and to provide the matrix with sufficient crush strength. If desired, higher ratios of binder to aggregate are employed to substantially or even completely fill the voids in the aggregate matrix to provide maximum water resistance and to further enhance crush strength. For lowest matrix weight and for economic purposes, however, it is preferable to utilize a reduced ratio of binder to aggregate.

Accordingly, the broad range of weight ratio of aggregate to binder is from about 2.70:1 to 0.60:1 and more preferably from about 1.85:1 to 1.00:1.

A flame retarding agent, such as alumina trihydrate, can be employed in amounts from about 30-35% based on the total weight of aggregate, binder and flame retarding agent.

If desired, the present polymer concrete can be formed into a prefabricated unit and thereafter bonded to a concrete substrate or over layer. The polymer concrete can be patched, if chipped, by employing the binder either alone or with the aggregate material.

The following formulations represent examples of concrete of the class here described for a variety of applications such as LNG storage tank dike and containment area insulation.

EXAMPLE 1

Insulated Polymer Concrete Composition

A typical polymer concrete of the invention is formed and tested after being spread over an epoxy tack coat overlying a concrete slab.

|  | Volume % | Weight % |
| --- | --- | --- |
| Hollow aluminum silicate spheres | 30–36 | 10–15 |
| Coated perlite | 28–32 | 20–25 |
| Alumina trihydrate | 14–15 | 30–35 |
| Epoxy resin | 21–23 | 45–50 |

The thermal and mechanical properties of such compositions are typically as follows:

| | |
| --- | --- |
| Thermal conductivity | k = 0.1 to 0.2 Btu/hr-ft-°F. |
| Density | 50 to 60 lb/ft |
| Compressive strength (7 day) | 2000–3500 psi |
| Bond strength to concrete (in shear) | 600–900 psi |
| Water absorption (soaked in water for 24 hrs.) | 0.1 to 1.0 wt % |
| Linear shrinkage | Minimal |

EXAMPLE 2

Formulations of the invention were prepared for overlaying the sloped walls of a dike. The formulations were applied as in Example 1. They exhibited good workability and did not sag. The formulations are as follows:

| Material | Weight % |
| --- | --- |
| Composite A - Formed into Sloped Walls | |
| Ultralite PC 8/40[1] | 14.8 |
| Fillite 50/120[2] | 22.2 |
| Alumina trihydrate | 24.6 |
| Epoxy Resin Dural 382[3] | 38.4 |
| Composite B - Applied to the base of the dike | |
| Ultralite PC 8/40 | 10.9 |
| Fillite 50/120 | 19.6 |
| Alumina trihydrate | 27.2 |
| Epoxy Resin Dural 348 | 42.3 |

[1]Ultralite PC 8/40 is a trademark of Fillite USA for coated perlite.
[2]Fillite 50/120 is a trademark of Fillite USA for microspheres of aluminum silicate.
[3]Dural 382 and 348 are trademarks of Dural International for epoxy resins.

The compressive strength (in psi) of the polymer concretes were tested after the indicated time as follows according to ASTM C495:

| number, days | Composite A | Composite B |
| --- | --- | --- |
| 1 | 1350 | 2630 |
| 7 | 2477 | 3188 |
| 10 | 2730 | — |

The modulus of elasticity (ASTM C78) were calculated between 80,000 to 100,000 psi for the composites. The average flexure strength of 2 in.×2 in.×12 in. beams tested as per ASTM C78 was about 700 to 1,000 psi.

The average water absorption calculated by submerging samples of the composites for 24 hours was only 0.2% on the basis of the formula $$\% = \frac{W - W_o}{W_o}$$

Water permeability tests were conducted with the composite samples subjected to constant water pressure for 2 days. The tests showed that the composites were impermeable.

The flammability of the composites were tested according to ASTM D635. Beams cast of the composites were ignited by a propane flame for 30 seconds. The samples did not burn beyond the initial ignition point. Accordingly, they can be deemed non-flammable.

EXAMPLE 3

Polymer concrete formulations of the invention were prepared having acceptable workability as follows:

| Aggregate, Wt. % | | | | | | Aluminum trihydrate | Dural Resin (No.) in Wt. % |
|---|---|---|---|---|---|---|---|
| Fillite | | | Ultralite | | | | |
| 50/120 | 52/7S | 100/7 | PC 8/40 | PCA 8/40 | PC 8/100 | | |
|  | 13.0 |  |  |  | 20.0 | 13.0 | 52.0 (348) |
|  | 13.0 | 13.0 |  |  |  | 36.3 | 37.7 (348) |
|  | 9.8 | 9.8 |  |  | 10.1 | 27.8 | 42.5 (348) |
|  | 19.5 |  |  | 10.2 |  | 27.8 | 42.5 (348) |
| 19.5 |  |  | 10.2 |  |  | 27.8 | 42.5 (395) |
| 23.9 |  |  | 8.0 |  |  | 26.6 | 41.5 (395) |
|  | 20.8 |  | 5.7 |  |  | 28.7 | 44.8 (395) |

Fillite 50/120, 52/7S and 100/7 and Ultralite PC 8/40 PCA 8/40 and PC 8/100 are trademarks of Fillite USA for aluminum silicate microspheres (Fillite) and coated perlite (Ultralite), respectively.

Dural 348 and 395 are trademarks of Dural International for epoxy resin.

The above material can be cast in place on top of a portland cement concrete substrate the surface of which has been cleaned by washing with an HCl solution or mechanically abraded by sandblasting or other abrasion methods. Since the epoxy resin is moisture resistant, it can be placed at any time in which ambient temperature is between 50° and 100° F. regardless of the moisture content of the substrate.

In the event that the polymer concrete of the present invention is to be placed on a concrete substrate that is sloped or vertical, a thixotropic agent, such as fumed silica (Cab-O-Sil, HiSil) or bentonite clay (Bentone, Claytone) can be added to the epoxy prior to mixing it with the aggregate to prevent the concrete from sagging.

The surface of the concrete can be finished by hand or by mechanical screens and magnesium floats. In order to assist the finishing operation, water may be lightly sprinkled on the screeded surface prior to finishing with the magnesium float.

We have found that insulating polymer concrete, as here described is superior in water resistance by an order of about 6 to 10 times compared to portland cement - perlite concretes and has a compressive strength of the order of 10 times greater than such concretes.

We believe that the composition and use of the novel insulating polymer concrete will now be understood and that the several advantages thereof will be fully appreciated by those persons skilled in the art.

We claim:

1. A lightweight insulating polymer concrete having enhanced water resistance, enhanced crush strength and increased flame retardancy comprising:
    (a) a lightweight aggregate selected from the group consisting of hollow aluminum silicate spheres, expanded perlite coated with polyester resin and mixtures thereof;
    (b) an epoxy resin binder; and
    (c) a hydrated particulate flame retarding agent.

2. A lightweight insulating polymer concrete according to claim 1, wherein said flame retarding agent is aluminum trihydrate.

3. The lightweight insulating polymer concrete of claim 1 in which the weight ratio of aggregate to binder is from about 1.85:1 to 1.00:1.

4. The lightweight insulating polymer concrete of claim 1 wherein the lightweight aggregate is a mixture of hollow aluminum silicate spheres and expanded perlite coated with polyester resin.

* * * * *

UNITED STATES PATENT AND TRADEMARK OFFICE
CERTIFICATE OF CORRECTION

PATENT NO. : 4,689,358            Page 1 of 2

DATED : August 25, 1987

INVENTOR(S) : H. PETER SCHORR, ET AL.

It is certified that error appears in the above-identified patent and that said Letters Patent is hereby corrected as shown below:      Title page:

AT [57] IN THE ABSTRACT

Lines 2-3,   "water resistance" should read --water-resistant--.

COLUMN 1

Line 13,   "combustable" should read --combustible--.

COLUMN 2

Line 26,   "water resistant" should read --water-resistant--.
    Line 68,   "contained" should read --containment--.

COLUMN 3

Line 9,    "aggregate" should read --aggregates--.
    Line 22,   "obtained in" should read --obtained, in--.
    Line 22,   "case, a" should read --case a--.

UNITED STATES PATENT AND TRADEMARK OFFICE
CERTIFICATE OF CORRECTION

PATENT NO. : 4,689,358
DATED : August 25, 1987
INVENTOR(S) : H. PETER SCHORR, ET AL.

It is certified that error appears in the above-identified patent and that said Letters Patent is hereby corrected as shown below:

COLUMN 5

Line 39, "PC 8/40" should read --PC 8/40,--.

Signed and Sealed this

Twenty-ninth Day of December, 1987

Attest:

DONALD J. QUIGG

Attesting Officer

Commissioner of Patents and Trademarks